July 29, 1952 E. F. McCLAIN, JR 2,605,400

HIGH STABILITY RADIO WAVE FREQUENCY CONVERTER

Filed Oct. 11, 1945

Inventor
EDWARD F. MC CLAIN, JR.

By Ralph L. Chappell

Attorney

Patented July 29, 1952 2,605,400

UNITED STATES PATENT OFFICE 2,605,400

HIGH STABILITY RADIO WAVE FREQUENCY CONVERTER

Edward F. McClain, Jr., Washington, D. C.

Application October 11, 1945, Serial No. 621,658

4 Claims. (Cl. 250—20)

Figures 1, 2, 3:
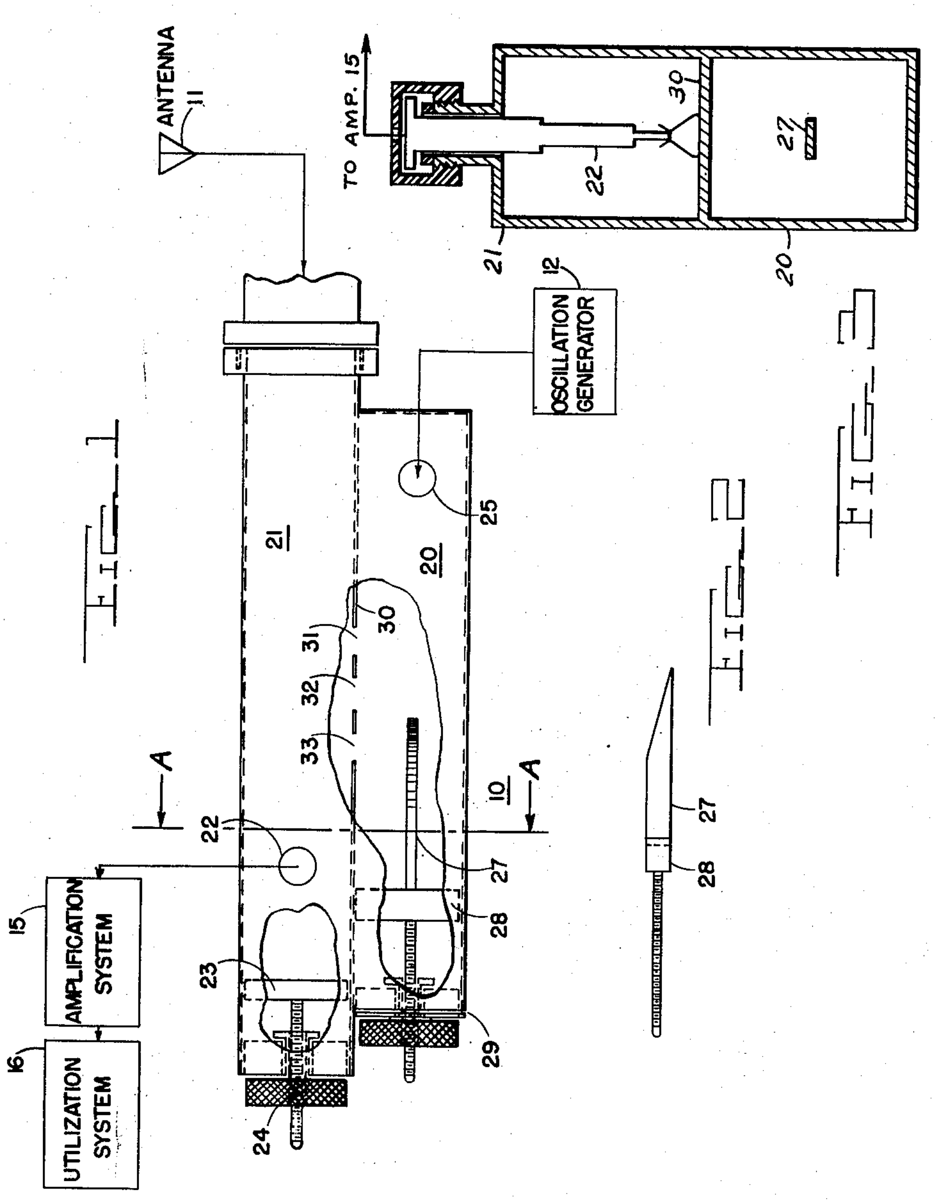

(Granted under the act of March 3, 1883, as amended April 30, 1928; 370 O. G. 757)

This invention relates to frequency conversion systems for use in particular in superheterodyne receivers operating at high frequencies.

Present receiving systems suitable for use at the higher radio frequencies 10,000 megacycles per second, for example, are generally of the superheterodyne type employing a crystal detector without prior radio frequency amplification and having waveguide coupling between the crystal detector and the antenna system. In these systems it is therefore necessary to introduce the local oscillator signal into the waveguide so that a part of it will be absorbed in the crystal detector to produce a heterodyne or beat signal at the intermediate frequency. In prior converter systems it was not possible to apply the local oscillator signal to the waveguide without experiencing some loss of the oscillator signal to the antenna. This was undesirable because the power loss represented a loading upon the local oscillator which was subject to considerable variation due to slight misadjustments of the waveguide, changes in antenna loading due to nearby objects, and numerous other causes. This variable loading often resulted in a "pulling" of the local oscillator frequency and under certain conditions was sufficient to cause the local oscillator to cease functioning entirely.

Therefore an object of this invention is to provide a high frequency mixer system for use in a superheterodyne type receiver and in which the antenna and the lines connecting the mixer to the antenna do not absorb energy from the receiver local oscillator and hence cannot produce a variable loading upon it.

Another object of this invention is to provide a method of introducing a controllable amount of local oscillator energy into a high frequency receiver mixer system of the foregoing type.

Other objects and features of the present invention will become apparent upon a careful consideration of the accompanying drawing and detailed description.

In the drawing, Fig. 1 is a partly cut-away view of a converter system constructed according to the principles of the invention and employed in a high frequency receiver system, Fig. 2 is a view of a terminating load employed in the converter system and Figure 3 is a cross-sectional view taken at A—A of Figure 1 to show the conventional crystal detector as used in the converter system.

With reference to Fig. 1, a mixer unit indicated in general at 10 is shown which is adapted to receive two signals of different frequencies and to produce therefrom an output signal which has a frequency equal to the difference between the frequencies of the input signals.

In the preferred embodiment, the mixer 10 consists of two sections of rectangular waveguide placed parallel one to the other and having a common separating wall in the narrow guide dimension. This separating wall is perforated in a special manner to permit the transfer of energy from one guide to the other. To a first waveguide section energy from the local oscillator 12 is applied. This energy proceeds through the guide and is absorbed in a movable energy consuming device. This energy consuming device, shown also in Fig. 2, comprises typically a graphite coated tapered Bakelite septum 27 placed longitudinally in the guide parallel to the common separating wall. This energy consuming device presents a matched load to the waveguide section so that energy entering the guide is absorbed therein without reflection.

Energy received by the antenna 11 from a distant signal source having a frequency different from that of the local oscillator 12 is applied to the second waveguide section of mixer 10. Coupled to the waveguide section 21 is a unilateral power consuming device 22—typically a crystal detector as shown in Figure 3—which, in absorbing energy from the antenna 11 and from the oscillator 12, produces a heterodyne beat signal at the difference in frequency between the two signals. This difference in frequency is then selectively amplified by the system 15 provided for that purpose and applied to a suitable utilization device 16. The unilateral power consuming device 22 is coupled to the second waveguide section at a point of impedance match such that a maximum absorption of the energy entering waveguide 21 occurs. To produce this effect additional impedance matching means not shown may be incorporated.

The perforations in the separating wall 30 are located so that energy transfer between guides 20, 21 can be accomplished only in a specific manner. Typically they are placed a quarter wavelength apart. Energy entering waveguide 21 from waveguide 20 through a single aperture in the separating wall would normally be propagated in both directions, some passing to the power consuming device 22 and some to the antenna 11. As previously mentioned, the passage of energy to antenna 11 is undesirable because any change in antenna loading or mismatch in the lines leading thereto results in a change of load upon oscillator 12. In this typical case the passage of energy to the antenna 11 is prevented by the placement in wall 30 of a plurality of apertures at a quarter wavelength spacing. Thus energy entering from aperture 31 and traveling in the direction of antenna 11 is counteracted by energy entering from aperture 32 which arrives in the vicinity of aperture 31 bearing a 180 degree phase relationship to it. It was found that two apertures produced insufficient transfer of energy from guide 20 to guide 21, therefore a third opening 33 was placed in the separating wall 30 and the central aperture 32 was enlarged to produce cancellation of the backward traveling energy from both apertures 31, 33.

Since a crystal detector device as employed here requires a definite current flow therethrough to provide optimum operation, some means for varying the amplitude of the signal voltage applied thereto is desirable. The tapered load 27 placed in waveguide 20 causes gradual absorption of energy from the guide and consequent gradual attenuation of signal voltage throughout its length. Therefore load 27 is provided with a variable positioning device so that it may be moved to vary the signal amplitude in the waveguide 20 in the vicinity of each aperture and consequently the amount of energy transfer between waveguides.

In the construction of the mixer few dimensions are critical but certain points must be borne in mind. The transverse dimensions of the waveguides are calculated according to known waveguide formulae. The center to center spacing of the apertures 31, 32, 33 is made a quarter of a wavelength at the frequency of the local oscillator 12. Coupling to the local oscillator 12 is generally made in a matched impedance manner such that the waveguide 20 produces optimum loading upon the local oscillator 12. Where a crystal detector 22 is installed directly in waveguide 21 or located remotely and coupled thereto, it is desirable to place the detector or the coupling device at a point which will produce maximum absorption of the energy entering waveguide 21 by the detector 22. In many cases additional impedance converting devices such as capacitive plungers (not shown) and a movable waveguide termination 23 are desirable.

In a typical mixer of this structure suitable for use in the vicinity of 10,000 mc., the total length of travel from a 723A/B local oscillator to aperture 31 was approximately two inches. Waveguide dimensions of $\frac{7}{8}$ by $\frac{3}{8}$ inch were employed. Apertures 31, 33, were $\frac{5}{16}$ inch in diameter and aperture 32 was $\frac{3}{8}$ inch in diameter. The length of travel from a 1N21B crystal mounted in guide 21 at point 22 to the aperture 33 was approximately $1\frac{1}{2}$ inches.

It is apparent that the principles of the present invention are applicable to other waveguide structures, for example, cylindrical waveguide sections could be used. Furthermore, other types of directive coupling arrangements, such as, for example, a long narrow slot placed longitudinally in the separating wall section would be satisfactory.

From the foregoing discussion it is apparent that considerable modification of the features of this invention are possible, and while the device herein described and the form of apparatus for the operation thereof, constitutes a preferred embodiment of the invention it is to be understood that the invention is not limited to this precise device and form of apparatus, and that changes may be made therein without departing from the scope of the invention.

The invention described herein may be manufactured and used by or for the Government of the United States of America for governmental purposes without the payment of any royalties thereon or therefor.

What is claimed is:

1. A mixer system for producing heterodyne signals from two input signals of different frequency; comprising, a pair of juxtaposed waveguide sections providing energy transmission predominately in the same primary direction in adjacent parallel paths, said wiveguide sections possessing a common perforated separating wall with quarter wave spaced perforations functioning as a directive coupling device between said waveguide sections preventing reversal of the primary direction of energy transmission in the parallel paths, means applying a first one of said input signals to a first one of said waveguide sections, a power consuming device placed near one end of said first waveguide section, means applying the second of said input signals to one end of the second waveguide section, and a unilateral impedance device coupled near a second end of said second waveguide section.

2. A mixer system for producing heterodyne signals from two input signals of different frequency; comprising, a pair of juxtaposed waveguide sections providing energy transmission predominately in the same primary direction in adjacent parallel paths, said waveguide sections possessing a common perforated separating wall with quarter wave spaced perforations, said separating wall functioning as a directive coupling device between said waveguide sections preventing reversal of the primary direction of energy transmission in the parallel paths, coupling means applying a first one of said input signals to a first one of said waveguide sections, a movable power consuming device near one end of said first waveguide section, coupling means applying the second of said input signals to one end of the second waveguide section, and a unilateral impedance device coupled near a second end of said second waveguide section.

3. A mixer system for producing heterodyne signals from two input signals of different frequency; comprising, a pair of juxtaposed waveguide sections providing energy transmission predominately in the same primary direction in adjacent parallel paths, said waveguide sections possessing a common perforated separating wall with quarter wave spaced perforations functioning as a directive coupling device between said waveguide sections preventing reversal of the primary direction of energy transmission in the parallel paths, coupling means applying a first one of said input signals to one of said waveguide sections, a carbonized power consuming device placed near one end of said first waveguide section to provide a matched termination thereof, coupling means applying the second of said input signals to one end of the second waveguide section, and a unilateral impedance device coupled near a second end of said second waveguide section.

4. A mixer system for producing heterodyne signals from two input signals of different frequency; comprising, a pair of juxtaposed waveguide sections providing energy transmission predominately in the same primary direction in adjacent parallel paths, said waveguide sections possessing a common perforated separating wall with quarter wave spaced perforations functioning as a directive coupling device between said waveguide sections preventing reversal of the primary direction of energy transmission in the parallel paths, coupling means applying said first input signal to one of said waveguide sections, a power consuming device movably positioned in said first waveguide section to vary the region in said waveguide section at which absorption of energy from said first input signal occurs, coupling means applying the second of said input signals to the second waveguide section, and a crystal detector inserted in said second waveguide section to produce maximum absorption of power from said waveguide section by said detector.

EDWARD F. McCLAIN, Jr.

REFERENCES CITED

The following references are of record in the file of this patent:

UNITED STATES PATENTS

| Number | Name | Date |
|---|---|---|
| 2,142,159 | Southworth et al. | Jan. 3, 1939 |
| 2,153,728 | Southworth | Apr. 11, 1939 |
| 2,423,390 | Korman | July 1, 1947 |
| 2,423,526 | Sontheimer | July 8, 1947 |
| 2,436,830 | Sharpless | Mar. 2, 1948 |
| 2,442,606 | Korman | June 1, 1948 |